United States Patent [19]

Schneider et al.

[11] Patent Number: 4,652,716
[45] Date of Patent: Mar. 24, 1987

[54] PROCESS AND MECHANISM FOR THREADING THE ELECTRODE WIRE OF AN EDM APPARATUS

[75] Inventors: Rudolf Schneider, Reinach, Switzerland; Joseph Josserand, Cruseilles, France

[73] Assignee: Charmilles Technologies, S.A., Geneva, Switzerland

[21] Appl. No.: 769,730

[22] Filed: Aug. 27, 1985

Related U.S. Application Data

[63] Continuation-in-part of Ser. No. 685,340, Dec. 24, 1984, Pat. No. 4,547,647, which is a continuation of Ser. No. 512,936, Jul. 12, 1983, abandoned, which is a continuation-in-part of Ser. No. 246,072, Mar. 20, 1981, abandoned.

[30] Foreign Application Priority Data

Mar. 24, 1980 [CH] Switzerland .................... 2299/80
Mar. 21, 1981 [CH] Switzerland ...................... 382/81

[51] Int. Cl.$^4$ ............................................ B23P 1/08
[52] U.S. Cl. ............................ 219/69 M; 219/69 W
[58] Field of Search .............. 219/69 M, 69 W, 69 E, 219/69 C, 69 R

[56] References Cited

U.S. PATENT DOCUMENTS

| | | | |
|---|---|---|---|
| 3,987,270 | 10/1976 | Ullmann et al. | 219/69 W |
| 4,298,782 | 11/1981 | Wavre | 219/69 W |
| 4,414,458 | 11/1983 | Nomura | 219/69 W |
| 4,495,393 | 1/1985 | Janicke | 219/69 W |

Primary Examiner—M. H. Paschall
Attorney, Agent, or Firm—Hauke and Patalidis

[57] ABSTRACT

A method and apparatus for threading the electrode wire of a travelling wire EDM apparatus through an aperture in a workpiece. Prior to automatically threading the wire through the aperture in the workpiece, the wire is continuously straightened by pulling longitudinally on the wire, and the wire is passed through a guide tube and through a nozzle to which fluid under pressure is supplied for forming a jet stream at the outlet of the nozzle. Prior to a threading or rethreading operation the wire is cut off proximate to the outlet of the nozzle. The nozzle outlet is brought in close proximity to the aperture in the workpiece and the jet stream is aimed at the aperture in the workpiece for guiding the wire through the aperture, while being maintained coaxially by the jet stream. The consecutive steps for feeding the end of the wire through an aperture in the workpiece are effected in sequence for initial threading of the wire through a pre-drilled stating hole in the workpiece, or for rethreading the wire through a cut in the workpiece after accidental rupture of the wire during a cutting operation.

5 Claims, 3 Drawing Figures

PROCESS AND MECHANISM FOR THREADING THE ELECTRODE WIRE OF AN EDM APPARATUS

CROSS-REFERENCE TO RELATED APPLICATIONS

The present application is a continuation-in-part of application Ser. No. 685,340, filed Dec. 24, 1984, now U.S. Pat. No. 4,547,647, issued Oct. 15, 1985, which is a continuation of application Ser. No. 512,936, filed July 12, 1983, which is a continuation-in-part of application Ser. No. 246,072, filed Mar. 20, 1981, now abandoned, all assigned to the same assignee as the present application.

BACKGROUND OF THE INVENTION

The present invention relates generally to a process and mechanism for threading an electrode wire through an aperture in an electrode workpiece in an electrical discharge machining apparatus of the type generally referred to as a travelling wire EDM apparatus. More particularly, the present invention relates to an electrode wire threading method and mechanism wherein the end of the electrode wire is introduced into a jet stream of fluid directed towards the aperture in the workpiece, in order to be guided by the jet stream of fluid through the aperture.

Diverse arrangements have been proposed in the past for automatically threading the electrode wire of a travelling wire EDM apparatus through a hole or aperture pre-drilled in the workpiece. For example, U.S. Pat. No. 3,987,270 and published Japanese application No. 15897/76 disclose such devices. Practical embodiments of the devices disclosed in one or the other of those publications are very difficult to accomplish, if not impossible, because guiding the wire by a stream of liquid is not sufficient to accurately and repeatedly bring the end of the electrode wire directly opposite the aperture in the workpiece.

The present invention overcomes such difficulties and achieves, repetitively, automatic threading of an electrode wire through an aperture in a workpiece.

SUMMARY OF THE INVENTION

The method and apparatus of the invention are characterized in that the electrode wire is straightened and guided in a tube prior to introducing the end of the wire in the jet stream of fluid, and the speed of displacement of the wire within the jet stream of fluid is effectively controlled.

The many advantages and objects of the present invention will be apparent to those skilled in the art when the following description of the best mode contemplated for practicing the invention is read in conjunction with the attached drawing showing schematically, and for illustrative purpose only, a structure for practicing the method of the invention. In the drawings:

DETAILED DESCRIPTION OF THE PREFERRED EMBODIMENT

Figure 1:
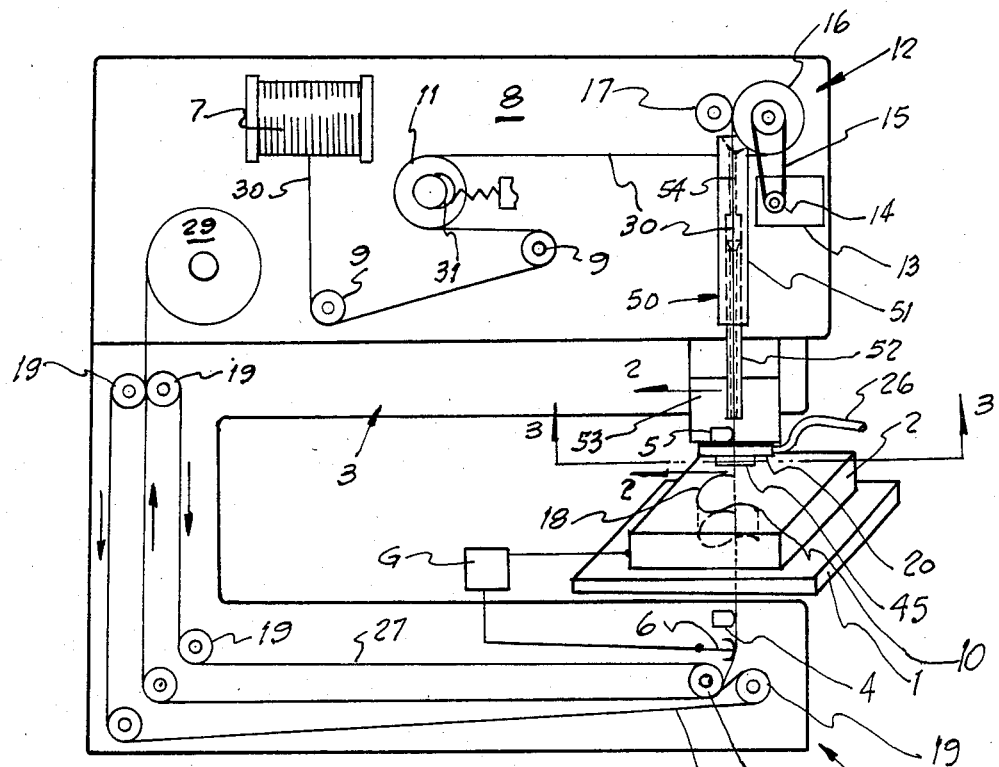
FIG. 1 is a schematic elevation view of a travelling wire EDM apparatus illustrating the arrangement of elements for feeding an electrode wire through a workpiece.

Referred to FIG. 1 of the drawing, a travelling wire EDM apparatus comprises a support table 1 for a workpiece 2 on which a cut is to be effected. The support table is provided with cross-slides, not shown, such as to be movable horizontally along the X- and Y-axes, according to an appropriate program, for effecting a cut 18 in the workpiece 2 along a predetermined path, as is well known in the travelling wire EDM technology. A generally C-shaped frame member 3 supports a pair of electrode wire guide members 4 and 5 causing an electrode wire 30 to assume a predetermined rectilinear shape between the guide members 4 and 5, and electrical machining pulses are supplied from a pulse generator G and applied across the workpiece 2 and the electrode wire 30, one terminal of the generator G being connected to the workpiece 2 and the other terminal being connected to the electrode wire 30 through one or more sliding contacts 6, as is also well known in the art. The sliding contact, or contacts, 6 is usually made of tungsten, while the electrode wire guide members 4 and 5 are made of sapphire. The guide member 4, and more specifically the guide member 5, are reciprocable, for example by means of a hydraulic or electrical actuator, not shown, from a position wherein the guide member tip engages laterally the electrode wire 30 to a position away from the electrode wire 30, the guide member 5 being shown at FIG. 1 in engagement with the electrode wire 30, and at FIG. 2 retracted away from the electrode wire 30.

The electrode wire 30 is unwound from a supply spool 7 mounted on a plate 8 affixed to the top of the frame 3. The electrode wire 30, after unwinding from the supply spool 7, is passed over a series of rollers, 9, 9' and 11 prior to being introduced into a feeding mechanism 12. The feeding mechanism 12 comprises a motor 13 which, through a gear associated with a one-way drive free-wheeling clutch mechanism 14, well known in the art and not shown in detail, and by means of a belt drive 15, drives in rotation a feed drum 16 provided with a guiding groove, not shown, for the electrode wire 30, a pinch roller 17 applying the electrode wire 30 against the bottom of the groove on the feed drum 16. The feed drum 16 is further provided with an over-run mechanism comprising an adjustable brake mechanism, well known in the art, which is not shown in detail and which ensures that the electrode wire 30 is under tension during normal operation, the adjustable brake mechanism opposing the pulling action of an electrode wire transport mechanism 40 disposed beyond the workpiece support table 1.

The feeding mechanism 12 further comprises a telescopic wire guide tube 50 having a section 51 attached to the support plate 8 and a section 52, telescopable into the end of the section 51, attached to a vertically reciprocable slide 53 which supports the guide member 5. The slide 53 is controllably displaceable by an appropriate stepping motor lead screw or by an hydraulic jack, not shown. A nozzle 20, supplied in pressurized fluid by a conduit 26, the fluid being preferably the same fluid as the dielectric and cooling fluid used in the EDM apparatus is mounted on the end of the vertically reciprocable slide 53. The nozzle 20 is described in further detail with reference to FIG. 2. A wire cutting mechanism 45, described in further detail with respect to FIG. 3, is mounted below the nozzle 20.

The telescopic tube 50 has a longitudinal bore 54 of a diameter slightly larger than the diameter of the electrode wire 30 such that, after the electrode wire 30 being fed from the grooved feed drum 16 and associated pinch roller 17 has been introduced at its end through the longitudinal bore 54 in the telescopic tube 50, it is guided by the bore 54 to the outlet of the lower tube portion 52, proximate to the guide member 5 and in alignment with the nozzle 20. The telescoping wire guide tube 50 may be made of insulating material or, in the alternative, it may be made metallic, in which case it is preferably insulated from the frame 3 of the EDM apparatus and from the plate 8, and may be connected to the terminal of the pulse generator G to which is connected the sliding contact 6.

The wire transport, or conveyor, mechanism 40 comprises a pair of endless belts 27 and 28, travelling in the same direction where in mutual engagement, and supported by a plurality of rollers 19. The belts form an arrangement for grabbing the end of the wire 30 after passage through the workpiece 2, and for transporting the wire to a receiving spool 29, or other convenient used wire disposal such as, for example, a receptacle. The endless belts 27 and 28 are driven by a motor, which is not shown as such an arrangement is also well known with regard to travelling wire EDM apparatus.

Prior to starting a cut on the workpiece 2, the workpiece is provided with a drilled start hole or aperture 10 for threading the electrode wire 30 therethrough. Prior to threading the electrode wire 30 through the pre-drilled hole 10, the end of the wire is cut off by the wire cut-off mechanism 45, and the wire 30 is fed towards the pre-drilled hole 10, while being guided by a jet stream 34, FIG. 2, of fluid provided by the nozzle 20.

Figure 2:
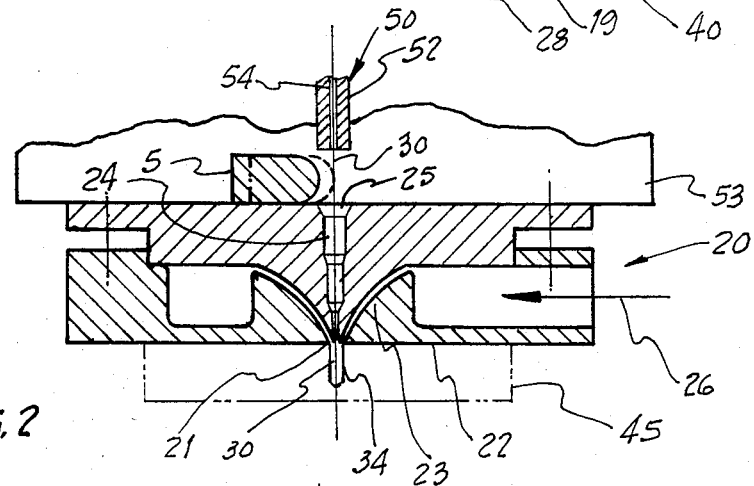
FIG. 2 is a section through a nozzle for obtaining a fluid jet stream, forming part of the apparatus illustrated at FIG. 1.
Figure 3:
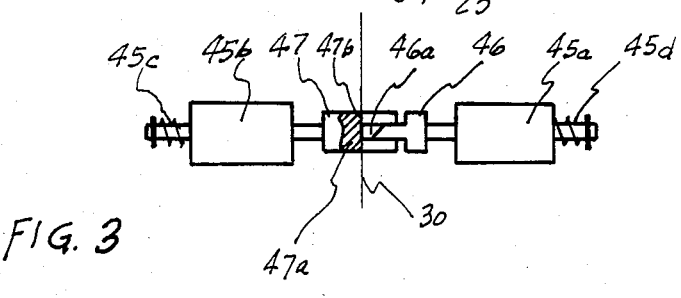
FIG. 3 is a schematic representation of a wire cutting mechanism, which also forms part of the apparatus of FIG. 1.

As shown in detail at FIG. 2, the nozzle 20 presents a straight line passage of the wire 30 therethrough, the outlet of the nozzle being directed towards the hole or aperture 10 in the workpiece 2. The nozzle has an annular channel 22 generally shaped as a funnel, and a centrally disposed generally conical portion 23, the shape and dimension of the funnel-shaped annular channel 22 and of the conical portion 23 being such as to provide a non-turbulent steady laminar flow of fluid. The result is that a non-turbulent jet stream 34 of fluid is achieved at the outlet 21 of the nozzle 20, the jet stream being clearly delineated, which is quite capable of carrying or propelling the electrode wire 30, as a result of surface friction exerted on the wire which could thus be propelled by the jet stream of fluid much more slowly than the jet stream. However, as will become apparent hereinafter, the present invention does not rely exclusively on the fluid jet stream propellant characteristics for feeding the wire 30 longitudinally, but relies on the fluid jet stream for aiming the end of the wire to the aperture 10 in the workpiece 2 for threading the wire through the aperture. A wire guiding channelway 24, having a frusto-conical inlet 25 and a progressively reduced diameter, is disposed through the conical member 23. The channelway 24 has a cross section of greater diameter than the wire 30 at the nozzle outlet 21, such that the wire does not touch the wall of the channelway, and is guided coaxially thereto. The wall of the channelway 24 has, therefore, a guiding function only in the event that the end of the wire 30 is slightly displaced laterally when first introduced through the nozzle 20.

The wire cut-off mechanism 45, FIG. 3, comprises a pair of cutting members 46 and 47 reciprocable towards each other from a dwell position to an operating position, and a guiding member 47b which is located in alignment with the axis of normal longitudinal feed of the wire 30, while the edge of the cut-off knife 46 mounted on the end of the cutting member 46 is subjected to a very short stroke, and therefore cuts off the end of the wire in co-operation with the knife back-up member 47a, very neatly and practically without bending over the cut-off end of the wire. The cutting members 46 and 47 are displaced towards each other in synchronism, by means of hydraulic motors 45a and 45b, consisting each of a cylinder and piston assembly. The cutting members 46 and 47 are returned to their dwell position by return springs 45c and 45d.

The apparatus of the invention functions as follows:

Original threading of the electrode wire 30 through the telescopic guide tube 50 and the starting aperture 10 in the workpiece 2 may of course be effected manually if so desired, the outlet 21 of the nozzle 20 being located above and concentric with the starting hole 10 in the workpiece 2. The wire transport mechanism or conveyor 40 is started and the end of the wire 20 is manually pushed through the starting hole 10 in the workpiece 2 until it is grasped by the wire transport mechanism or conveyor 40.

The invention, however, permits to effectuate automatic initial threading of the electrode wire 30 through the workpiece by first displacing the table 1 supporting the workpiece 2 to a position enabling the electrode wire 30 to run outside of the area of the workpieces, the wire being held under tension between the feed drum 16, which is free-wheeling, and the wire transport mechanism or conveyor 40. Fluid is supplied to the nozzle 20, and the cut-off mechanism 45 is actuated for cutting off the wire. As the motion of the wire is due primarily to the pull exerted by the wire transport mechanism or conveyor 40, as soon as the wire 30 is cut off by the wire cut-off mechanism 45 the motion of the wire 30 above the wire cut-off mechanism 45 is immediately stopped, as the pull exerted on the wire by the fluid jet stream 34 is not enough to overcome the braking action of the free-wheeling feed drum 16. The pulling exerted on the wire by the fluid jet stream 34 combined by the straightening and guiding function of the telescopic tube 50 are such that the wire 30, beyond the feed drum 16, and consequently the end of the cut off wire remain substantially straight. The table 1 is subsequently positioned to appropriate coordinates along the X- and Y-axes for aligning the pre-drilled threading aperture 10 through the workpiece 2 with the axis of the nozzle 20, as machining fluid is continuously supplied at high pressure to the nozzle 20 through the conduit 26, the pressure being about 10 bars or more. The motor 13 is started, driving the feed drum which propels the wire 30 at a predetermined velocity, much lower than the velocity of the jet stream 34 of fluid. Because the wire 30, which is generally made of copper or brass, has been straightened under tension between the drum 16 and the wire transport mechanism or conveyor 40, the end of the wire is held substantially centered in the jet stream 34 by the hydrodynamic forces applied on the wire. The jet stream 34 being aimed towards the pre-drilled aperture 10, the end of the wire is brought to the inlet of the aperture and is pushed through the aperture 10 without any difficulty, being fed through the aperture 10 by the push exerted by the feed drum 16. Displacing the slide 53 downwardly brings the outlet 21 of the nozzle 20 as close as convenient to the inlet of the aperture 10. After having been passed through the aperture 10 through the workpiece 2, the end of the wire abuts against the wire conveyor belt 28 and is grabbed between the belts 27 and 28 of the conveyor 40. The speed of the belts 27 and 28 being higher than the peripheral velocity of the feed drum 16, driven by the motor 13, the feed drum 16 is pulled at a higher speed by the wire 30, due to the free-wheeling drive of the drum 16, and the pull on the wire 30 is determined by the action of the brake 14 tending to slow down the drum 16. While effecting a cut in the workpiece 2, with the pulse generator G being turned on, and the wire guides 4 and 5 and the sliding contact 6 engaged with the electrode wire 30, the jet stream 34 of fluid is maintained through the nozzle 20 to flush the machining zone.

At the end of a cutting operating in the workpiece 2, the generator G is turned off, the wire upper guide 5 is retracted and the electrode wire 30 is cut off by the cut-off mechanism 45, the wire transport mechanism or conveyor 40 being in operation for a short period of time sufficient to evacuate the cut-off portion of the wire. The machine operator can then remove the workpiece 2 and replace it by a blank workpiece, or reset the workpiece in the event that several independent cuts must be effected on the same workpiece. Alternatively, when several independent cuts must be effected on the same workpiece and several pre-drilled threading apertures 10 are disposed through the workpiece, consecutive realignment of each of a plurality of pre-drilled threading apertures 10 with the axis of the nozzle 20 may be effected according to a predetermined program, without intervention of the machine operator, and the automatic threadng of the electrode wire 30 through the aligned threading aperture may be effected automatically, as previously described.

During a normal cutting operation, the motor 13 is normally stopped such that the drum 16 is free-wheeling, the pull on the wire being determined principally by the action of the brake 14 braking the rotation of the drum 16, and secondarily by the action of a brake 31 braking the rotation of the roller 11.

Consequently, in the event of accidental rupture of the electrode wire 30 during a cutting operation, which normally occurs in the machining zone, further longitudinal feed of the wire is immediately stopped as the used portion of the wire 30 is evacuated by the wire transport mechanism or conveyor 40. The portion of the wire 30 projecting beyond the nozzle 20 is automatically cut off by the wire cut-off mechanism 45, and the motor 13 driving the feed drum 16 is restarted such as to push the wire 30 through the telescopic tube 50 and automatically thread the end of the wire 30 through the cut 18 in the workpiece 2, the end of the wire being constantly held concentric to the nozzle outlet 21 by the jet stream 34 of fluid. It is to be noted that because the wire 30 was held under constant tension between the feed drum 16 and the wire transport mechanism or conveyor 40 prior to rupture, the wire is substantially straight and automatic rethreading through the cut in the workpiece may be effected without difficulty. Alternatively, the control of the motion of the table 1 along the X- and Y-axes may be programmed so as to reposition the pre-drilled starting aperture 10 in the workpiece 2 directly below, and in alignment with, the outlet 21 of the nozzle 20 such as to rethread the wire through the starting pre-drilled aperture and run the whole course of the path 18 without effecting a cut in the workpiece 2 until reaching the portion of the cut where rupture occurred, and then restarting the electrical discharges through the machining zone.

It is to be noted that a tension or pull is exerted on the wire 30 upstream of the feed drum 16 as determined by a brake 31 acting upon the roller 11. The pull on the wire 30 between the roller 11 and the feed drum 16 is much less than the pull between the feed drum 16 and the wire conveyor 40, i.e. the pull exerted on the wire 30 within the machining zone.

Because the wire 30 is substantially straightened prior to introducing it into the jet stream 34 of fluid, it can be accurately aimed towards the threading aperture 10 by a jet stream of fluid having a relatively low pressure, in the order of 1 to 2 bars. However, by using a fluid under high pressure, for example of at least 5 bars and in the order of 10 bars to multiples of 10 bars, the guiding effect of the jet stream on the wire is substantially increased such that the wire end can be easily guided even through it may be relatively stiff.

It will be appreciated that in the example of structure illustrated and described, two consecutive pulls are effected on the wire, namely a first pull between the roller 11 and the feed drum 16 with a relatively low tension force as caused by the action of the brake 31 on the roller 11, and a second pull which is effected under a stronger tension force between the feed drum 16 and the wire conveyor 40. It will be further appreciated that by supporting the lower portion 52 of the telescopic tube 50 on the slide 53, and as a result of supporting the nozzle 20 on the end of the slide 53, the outlet 21 of the nozzle 20 may be brought in close proximity with the workpiece 2, and the structure is capable of accommodating difference in thickness of the workpieces to be mounted on the cross-slide table 1, within the range of travel of the slide 53. It will be further appreciated that the electrode wire 30, after initial threading of the wire through the telescopic tube 50 and through the passageway 24 in the nozzle 20, remains constantly within the passageway 24 in the nozzle 20 following accidental rupture of the wire in the machining zone or following controlled cut-off of the wire by means of the wire cut-off mechanism 45.

Having thus described the present invention by way of an example of structure well designed to practice the invention, what is claimed is as follows:

1. An apparatus for threading and rethreading the electrode wire of a travelling wire EDM apparatus through an aperture in a workpiece, said apparatus comprising a spool supplying said electrode wire, a roller around which said wire is wound, a motor driven feed drum around which said wire is wound after passage around said roller, a pinch roller for applying said wire against said feed drum, brake means for applying a braking force on said roller whereby a first longitudinal pull is exerted on said wire between said roller and said motor driven feed drum, a guide tube for passage therein of said wire after leaving said motor driven feed drum, a nozzle having a passageway through which said wire is passed upon leaving said guide tube, means for supplying fluid to said nozzle for forming a jet stream of fluid maintaining said wire substantially coaxially in said passageway and in said jet stream of fluid, a wire cut-off mechanism disposed downstream of said nozzle and proximate said nozzle, a workpiece having an aperture for passing said wire upon leaving said nozzle, said nozzle and said wire cut-off mechanism being mounted on an end of a slide displaceable such as to place said nozzle in close proximity with said aperture in said workpiece, and a wire conveyor mechanism for engaging said wire after passage through said aperture for displacing said wire longitudinally while effecting a second pull on said wire between said motor driven feed drum and said wire conveyor mechanism, said second pull on said wire being effected at a force greater than that of said first pull.

2. The apparatus of claim 1 wherein said guide tube is telescopic, with an end portion thereof mounted on said slide.

3. The apparatus of claim 2 wherein said fluid supplied to said nozzle is at a pressure of at least 5 bars.

4. A method for threading and rethreading the electrode wire of a travelling wire EDM apparatus through an aperture in a workpiece, said method comprising feeding said wire from a supply spool to a braked roller, feeding said wire from said braked roller to a motor driven feed drum for effecting a first longitudinal pull on said wire by means of said feed drum while being tensioned between said braked roller and said feed drum, feeding said wire longitudinally through a telescopic guide tube, effecting a second longitudinal pull on said wire while in said telescopic guide tube for straightening said wire, passing said wire through a passageway in a nozzle, said nozzle being supplied with fluid for forming a jet stream of fluid maintaining said wire substantially coaxially in said nozzle passageway and in said jet stream of fluid, engaging said wire after passage through said nozzle passageway in a wire conveying mechanism whereby said wire conveying mechanism effects said second longitudinal pull on said wire between said feed drum and said wire conveying mechanism by over-running said feed drum by said wire conveying mechanism, cutting off said wire at a portion thereof downstream of said nozzle and proximate to said nozzle while simultaneously stopping said feed drum, aiming said jet stream of fluid to said aperture in the workpiece, restarting said feed drum for feeding the end of said wire through said aperture while being guided by said telescopic guide tube and said jet stream of fluid aimed at said aperture, simultaneously displacing a portion of said telescopic guide tube having an outlet proximate said nozzle and said nozzle toward the workpiece, and engaging the end of said wire after passage through said aperture with said wire conveying mechanism for re-establishing said second longitudinal pull on said wire.

5. The method of claim 4 wherein said fluid supplied to said nozzle is at a pressure of at least 5 bars.

* * * * *